United States Patent Office 3,076,852
Patented Feb. 5, 1963

3,076,852
PROCESS FOR MANUFACTURING ORGANIC PEROXIDE COMPOUNDS
Werner Lohringer and Johann Sixt, both of Munich, Bavaria, Germany, assignors to Wacker-Chemie G.m.b.H., Munich, Bavaria, Germany, a corporation of Germany
No Drawing. Filed July 27, 1959, Ser. No. 829,494
Claims priority, application Germany Aug. 4, 1958
5 Claims. (Cl. 260—610)

This invention relates to the manufacture of organic per compounds, and it has for its object to provide a novel and improved process for this purpose.

Another object of the invention is to provide a simple and efficient process for producing organic per compounds in higher yields than heretofore.

Other more specific objects and advantages will be apparent as the nature of the invention is more fully disclosed.

The method of producing organic per compounds which partly achieved great significance as polymerization catalysts has so far consisted of having per compounds of sulphuric acid or hydrogen peroxide act upon aldehydes, ketones, alcohols, organic acids, etc. in the presence of sulphuric acid or other strong acids, if necessary in an alkaline medium. Thus acetone peroxide was obtained from persulphate and acetone (Rieche, "Alkylperoxides and Ozonides," publishers Th. Steinkopff, 1931, page 83), while di-tertiarybutyl peroxide and tertiary butyl hydrogen peroxide were obtained from butyl hydrogen sulfate and hydrogen peroxide.

We have now found that organic per compounds can be made more advantageously and with higher yields if organic per acids are used as oxidizing agents in the presence of condensing agents.

A preferred oxidizing agent is peracetic acid which can easily be obtained from acetaldehyde. But other organic per acids, such as perpropionic acid, can also be used successfully.

In our process the following starting substances are used with success: aldehydes, for instance chloral and higher aldehydes, ketones, diketones, organic acids and their anhydrides, alcohols, for instance tertiary butyl alcohol, monobasic or multibasic acetylene carbinols, organic silicon compounds, for instance trimethyl chlorosilane, olefines, for example propylene and isobutylene. Mixtures of these compounds can also be used.

The attaching temperature of the peroxy group depends on the starting substance used. Therefore the working temperature varies widely from —10 to +75° C. But in certain cases the process can also be performed at the temperature of the boiling point of the reaction product.

The process is carried out in such a way that the per acid is allowed to flow into the applied component to be oxidized, in the presence of acids, for instance mineral acids, preferably sulphuric acid, perchloric acid, borofluoroetherate, hetero-polyacids, for instance silicotungstic acid, zinc chloride, and organic tertiary amines, for instance pyridine. But it may also be advantageous to add the compound to be oxidized gradually to the per acid employed, and to the condensing agent, using low temperatures, and eventually the reaction mixture is permitted to rise gradually to higher temperatures.

Depending on the nature of the peroxide, various ways are used for isolating the formed peroxide from the reaction medium.

Acetone peroxide and cyclohexanone peroxide are formed as precipitates and can easily be separated. On the other hand, ethylmethylketone peroxide, di-tertiary butylperoxide and also tertiary butylhydrogen peroxide are separated in a layer, and the separation can be perfected after the reaction by the addition of water. Distillation, preferably in a vacuum, also gets results, if the liberated acetic acid can be separated on the basis of different boiling points. In the same manner it is possible to further the layer separation by the addition of solvents and to phlegmatize the per compounds. If required, the acetic acid or organic acid and the condensing agent present can also be removed by neutralization. Finally, esterification of the acetic acid or other organic acids is also advantageous.

Example 1

15 g. acetone are added under vigorous mixing and ice cooling to a solution of 0.25 mol peracetic acid as a 60% solution in glacial acetic acid and 30 g. 70% sulphuric acid. After a short time the separation of a white precipitate of acetone peroxide begins, which after the completed reaction is filtered off, washed in water and pressed out. Its quantity is 18 g., melting point=130° C. This is the dimeric acetone peroxide.

Example 2

In a similar manner as in Example 1, 0.21 mol cyclohexanone are added to 0.22 mol 60% peracetic acid and 32 g. 63% sulphuric acid at a temperature of 15° C. The addition is done under cooling, in order to moderate the strongly exothermic reaction. After the addition is completed, the fluid is mixed under refrigeration with ice. The white precipitate is filtered off, washed with alcohol and dried. Yield: 18 g.

If 26 g. of a 77% sulphuric acid are used under the same starting conditions, the yield of the precipitate is lowered to 15 g. Still smaller is the yield of precipitate when only half the quantity of sulphuric acid is added. The use of dilute acid is also disadvantageous. For instance only 6.5 g. cyclohexanone peroxide are obtained with the use of 40 g. of 50% sulphuric acid.

The quantity of active oxygen is determined with potassium iodide and titration with sodium thiosulfate.

Example 3

32 g. of 70% sulphuric acid are treated as in Example 2 with 0.37 mol of peracetic acid and, while being stirred and ice cooled, brought into reaction with 18 g. of methylethylketone. After about 8 hours two layers have formed within the reaction fluid, of which the upper layer contains the main quantity of the formed peroxide. The separation of peroxide in the upper layer is aided by the addition of water. The layers are separated, the upper layer is washed and neutralized with bicarbonate. Yield 19.0 ccm.

Example 4

At an initial temperature of 5° C., 38 g. of tertiary butyl alcohol are added to 34 g. of 87% sulphuric acid while being stirred, and afterwards, at a temperature of 35° C., 60 ccm. of peracetic acid, containing ¼ mol of pure peracid, are added slowly while stirring without interruption. Thereafter it is heated up to 50° C., while the interior temperature rises to about 65° C. After 2 hours the reaction is completed. Two layers are formed. Water is added to aid the complete separation of the layers. The upper layer is a practically pure di-tertiarybutyl peroxide. Yield 83%. Boiling point 109–110° C. Besides small quantities of tertiarybutyl hydrogen peroxide are found.

The active oxygen is determined in each case by potassium iodide in a solution of glacial acetic acid, after prolonged cooking in a reflux condenser, and titration of the separated iodine by means of sodium thiosulphate.

It may be advantageous to add the peracetic acid from the beginning at a higher temperature, in order to quickly transform the quantity added at any time.

If the quantity of the sulphuric acid is reduced, more tertiarybutyl hydrogen peroxide is formed beside the di-tertiarybutyl peroxide.

*Example 5*

As per Example 4, 18.5 g. tertiary butyl alcohol are mixed with 10 ccm. of 70% perchloric acid. To this mixture ⅛ mol of peracid=16 ccm. of 60% peracetic acid-glacial acetic acid solution are added at a temperature of 45° C. drop by drop and then stirred for half an hour. The reaction time is about 2 hours, during which two layers are formed again. The upper layer is di-tertiarybutyl peroxide. Yield 17 ccm.

*Example 6*

⅛ mol of peracetic acid, as in Example 7, is mixed with 15 ccm. of pyridine and a little water and at a temperature of 5° C. it is slowly combined with benzoyl chloride=⅛ mol. Yield about 80%.

*Example 7*

For making the per compound of benzaldehyde ⅙ mol of peracetic acid in a 60% solution with glacial acetic acid are mixed with 250 g. of 80% sulphuric acid and, under ice cooling combined by stirring, with 6 g. of benzaldehyde. After a short while crystals of dibenzaldehyde-diperoxide are separated.

*Example 8*

Di-trichloroxy-ethylperoxide is made by mixing 35 ccm. of 80% sulphuric acid with 7.5 g. chloral while 5 ccm. of peracetic acid are slowly added by dripping under cooling. After a short while a crystalline substance of the above peroxide separates. Yield 6 g.

*Example 9*

Work proceeds as in Example 8, but ¼ mol of perpropionic acid is used instead of peracetic acid, in a 20% mixture with propionic acid. A similar yield of di-tributylperoxide=83% is achieved.

*Example 10*

To a solution of 16 ccm. of concentrated sulphuric acid in 16 ccm. of water, 40 ccm. of a mixture of glacial acetic acid and peracetic acid, containing 47% of peracetic acid, is added at a temperature of 0° to −5° C. Isobutylene is introduced at the beginning at about the same temperature under stirring into said mixture until the theoretically necessary amount is achieved according to the equation:

$$2(CH_3)_2C=CH_2+H_2O+CH_3COOOH \rightarrow (CH_3)_3C-OO-C(CH_3)_3+CH_3COOH$$

Thereby the temperature raises gradually to 10–15° C. The experiment is continued for 4 hours. Two layers are formed, the upper one contains di-t-butylperoxide. After washing with water to remove the acetic acid and sulphuric acid contained therein, 30 g. di-t-butylperoxide are obtained.

The invention claimed is:

1. A process for the manufacture of a peroxide of a compound selected from the group consisting of cyclohexanone, benzaldehyde, acetone, and methylethyl ketone, which comprises reacting said compound with an organic per acid selected from the group consisting of peracetic acid and perpropionic acid in the presence of a condensing agent selected from the group consisting of sulfuric acid, perchloric acid, and pyridine.

2. A process for the manufacture of cyclohexanone peroxide comprising reacting cyclohexanone with peracetic acid in the presence of sulphuric acid as a condensing agent.

3. A process for the manufacture of dibenzaldehyde-diperoxide comprising reacting benzaldehyde with peracetice acid in the presence of sulphuric acid as a condensing agent.

4. A process for the manufacture of acetone peroxide comprising reacting acetone with an organic per acid selected from the group consisting of peracetic acid and perpropionic acid in the presence of a condensing agent selected from the group consisting of sulphuric acid, perchloric acid and pyridine.

5. A process for the manufacture of methylethylketone peroxide comprising reacting methylethylketone with peracetic acid in the presence of sulphuric acid as a condensing agent.

References Cited in the file of this patent

UNITED STATES PATENTS

| | | |
|---|---|---|
| 851,752 | Houghton | Apr. 30, 1907 |
| 2,270,175 | Tadema | Jan. 13, 1942 |
| 2,847,433 | Ohlson et al. | Aug. 12, 1958 |
| 2,928,800 | Wernlund | Mar. 15, 1960 |

FOREIGN PATENTS

| | | |
|---|---|---|
| 403,052 | Germany | Sept. 19, 1924 |
| 540,370 | Great Britain | Oct. 15, 1941 |
| 880,370 | France | Dec. 28, 1942 |
| 1,154,135 | France | Oct. 28, 1957 |

OTHER REFERENCES

Kharasch et al.: Jour. of Organic Chemistry, vol. 15, No. 4, July 1950, pages 775–781.

Friess et al.: Jour. Amer. Chem. Soc., vol. 74 (1952), pages 1302–1305 (4 pages).

Buncel et al.: Jour. Chem. Soc. (London), 1958, pages 1550–1556.